(12) United States Patent
Sengupta et al.

(10) Patent No.: US 11,836,952 B2
(45) Date of Patent: Dec. 5, 2023

(54) ENHANCED USER EXPERIENCE THROUGH BI-DIRECTIONAL AUDIO AND VISUAL SIGNAL GENERATION

(71) Applicant: Microsoft Technology Licensing, LLC, Redmond, WA (US)

(72) Inventors: Sunando Sengupta, Reading (GB); Alexandros Neofytou, London (GB); Eric Chris Wolfgang Sommerlade, Oxford (GB); Yang Liu, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 17/240,510

(22) Filed: Apr. 26, 2021

(65) Prior Publication Data

US 2022/0343543 A1    Oct. 27, 2022

(51) Int. Cl.

| | |
|---|---|
| *G06K 9/00* | (2022.01) |
| *G06T 9/00* | (2006.01) |
| *G06T 3/60* | (2006.01) |
| *G10L 19/012* | (2013.01) |
| *G10L 25/51* | (2013.01) |

(Continued)

(52) U.S. Cl.
CPC ............... *G06T 9/00* (2013.01); *G06F 18/21* (2023.01); *G06T 3/60* (2013.01); *G10L 19/012* (2013.01); *G10L 25/51* (2013.01); *G10L 2019/0002* (2013.01)

(58) Field of Classification Search
CPC ......... G10L 13/00; G10L 15/00; G10L 17/18; G10L 21/06; G10L 19/012; G10L 25/51; G10L 2019/0002; G06F 18/21; G06T 3/60; G06T 9/00

See application file for complete search history.

(56) References Cited

U.S. PATENT DOCUMENTS

| | | | |
|---|---|---|---|
| 2019/0246075 A1* | 8/2019 | Khadloya | G06V 10/764 |
| 2021/0097727 A1* | 4/2021 | Mitchell | G10L 25/51 |

OTHER PUBLICATIONS

Abu-El-Haija, et al., "Youtube-8m: A large-scale video classification benchmark", In Journal of Computing Research Repository, Sep. 2016, 10 Pages.

(Continued)

*Primary Examiner* — Duy M Dang

(57) ABSTRACT

In various embodiments, a computer-implemented method of training a neural network for creating an output signal of different modality from an input signal is described. In embodiments, the first modality may be a sound signal or a visual image and where the output signal would be a visual image or a sound signal, respectively. In embodiments a model is trained using a first pair of visual and audio networks to train a set of codebooks using known visual signals and the audio signals and using a second pair of visual and audio networks to further train the set of codebooks using the augmented visual signals and the augmented audio signals. Further, the first and the second visual networks are equally weighted and where the first and the second audio networks are equally weighted. In aspects of the present disclosure, the set of codebooks comprise a visual codebook, an audio codebook and a correlation codebook. These codebooks are then used to create an visual image from a sound signal and/or a sound signal from a visual image.

19 Claims, 9 Drawing Sheets

(51) Int. Cl.
G06F 18/21 (2023.01)
G10L 19/00 (2013.01)

(56) References Cited

OTHER PUBLICATIONS

Arandjelovic, et al., "Look, listen and learn", In Proceedings of the Conference on Computer Vision, Oct. 22, 2017, pp. 609-617.
Athanasiadis, et al., "Audio-visual domain adaptation using conditional semi-supervised generative adversarial networks", In Journal of Neurocomputing, Nov. 29, 2019, pp. 1-14.
Aytar, et al., "Soundnet: Learning sound representations from unlabeled video", In Advances in Neural Information Processing Systems, Dec. 5, 2016, pp. 1-9.
Bertinetto, et al., "Fully-convolutional siamese networks for object tracking", In Proceedings of 14th ECCV Workshops on Computer Vision, Oct. 8, 2016, pp. 1-16.
Bromley, et al., "Signature verification using a "Siamese" time delay neural network", In Advances in neural Information processing systems, 1994, pp. 737-744.
Chen, et al., "Deep cross-modal audio-visual generation", In Proceedings of the Conference on Thematic Workshops of ACM Multimedia, Oct. 23, 2017, 349-357.
Chen, et al., "Integrating the data augmentation scheme with various classifiers for acoustic scene modeling", In Proceedings of the Detection and Classification of Acoustic Scenes and Events Workshop, Jul. 15, 2019, 5 Pages.
Choi, et al., "Structured set matching networks for one-shot part labeling", In Proceedings of IEEE Conference on Computer Vision and Pattern Recognition, Jun. 18, 2018, pp. 3627-3636.
Chorowski, et al., "Unsupervised speech representation learning using wavenet autoencoders", In Proceedings of IEEE/ACM transactions on audio, speech, and language processing vol. 27, Issue 12, Dec. 2019, pp. 2041-2053.
Chung, et al., "You said that?", In Repository of arXiv:1705.02966v2, Jul. 18, 2017, pp. 1-12.
Davenport, et al., "Cross modal perception in apes", In Journal of Neuropsychologia, vol. 11, Issue 1, Jan. 1973.
Davis, et al., "The visual microphone:Passive recovery of sound from video", In Journal of ACM Transactions on Graphics, vol. 33, No. 4, Jul. 2014, 10 Pages.
Gao, et al., "Learning to separate object sounds by watching unlabeled video", In Proceedings of the European Conference on Computer Vision, Sep. 8, 2018, pp. 1-9.
Hao, et al., "Cmcgan: A uniform framework for cross-modal visual-audio mutual generation", In Proceedings of the Thirty-Second AAAI Conference on Artificial Intelligence, Feb. 2, 2018, pp. 6886-6893.
Hu, et al., "Listen to the image", In IEEE Conference on Computer Vision and Pattern Recognition, Jun. 16, 2019, pp. 7972-7981.
Intraub, Helene, "The representation of visual scenes", In Trends in Cognitive Sciences vol. 1, Issue 6, Sep. 1997.
Karras, et al., "A style-based generator architecture for generative adversarial networks", In Proceedings of IEEE Conference on Computer Vision and Pattern Recognition, Jun. 15, 2019, pp. 4396-4405.
Koch, et al., "Siamese neural networks for one-shot image recognition", In ICML deep learning workshop, vol. 2., Jul. 10, 2015, 30 Pages.
Kong, et al., "Cross-task learning for audio tagging, sound event detection and spatial localization: Dcase 2019 baseline systems", In Journal of Computing Research Repository, Apr. 2019, 5 Pages.
Koutini, et al., "CP-JKU submissions to DCASE'19: Acoustic scene classification and audio tagging with receptive field-regularized cnns", In Proceedings of the Detection and Classification of Acoustic Scenes and Events Workshop, Oct. 2019, 5 Pages.
Kumar, et al., "Learning compositional sparse models of bimodal percepts", In Proceedings of Twenty-Eighth AAAI Conference on Artificial Intelligence, Jun. 19, 2014, pp. 366-372.

Li, et al., "Siamrpn++: Evolution of Siamese visual tracking with very deep networks", In IEEE Conference on Computer Vision and Pattern Recognition, 2019, pp. 4282-4291.
Mignot, et al., "An experimental study of future "natural" multimodal human computer interaction", In INTERACT'93 and CHI'93 Conference Companion on Human Factors in Computing Systems, Apr. 1993, pp. 67-68.
Morgado, et al., "Self-supervised generation of spatial audio for 360 video", In Advances in Neural Information Processing Systems, Dec. 3, 2018, pp. 1-11.
Ngiam, et al., "Multimodal Deep Learning", In Proceedings of the 28th International Conference on Machine Learning, Jun. 28, 2011, 8 Pages.
Oh, et al., "Speech2face: Learning the face behind a voice", In Proceedings of the Conference on Computer Vision and Pattern Recognition, Jun. 16, 2019, pp. 7539-7548.
Oord, et al., "Neural discrete representation learning", In Proceedings of 31st Conference on Neural Information Processing Systems, Dec. 4, 2017, pp. 1-10.
Owens, et al., "Visually indicated sounds", In Proceedings of the IEEE Conference on computer vision and pattern recognition, Jun. 27, 2016, pp. 2405-2413.
Reed, et al., "Generative adversarial text to image synthesis", In Journal of the Computing Research Repository, May 17, 2016, 10 Pages.
Seo, et al., "Acoustic Scene Classification Using Various Pre-Processed Features And Convolutional Neural Networks", In Proceedings of the IEEE International Conference on Acoustics, Speech and Signal Processing, May 12, 2019, 4 Pages.
Shen, et al., "Natural tts synthesis by conditioning wavenet on mel spectrogram predictions", In Proceedings of International Conference on Acoustics, Speech and Signal Processing, Apr. 15, 2018, pp. 4779-4783.
Stein, et al., "The merging of the senses", In Publication of MIT Press, 1993.
Storms, Russellll., "Auditory-visual cross-modal perception phenomena", In Technical Report of Naval Postgraduate School, Sep. 1, 1998, 275 Pages.
Tan, et al., "Spectrogram analysis via self-attention for realizing cross-model visual-audio generation", In Proceedings of IEEE International Conference on Acoustics, Speech and Signal Processing, May 4, 2020, pp. 4392-4396.
Tanveer, et al., "Unsupervised extraction of human-interpretable nonverbal behavioral cues in a public speaking scenario", In Proceedings of the 23rd ACM international conference on Multimedia, Oct. 2015, pp. 863-866.
Xu, et al., "Attngan: Fine-grained text to image generation with attentional generative adversarial networks", In Proceedings of IEEE conference on computer vision and pattern recognition, Jun. 18, 2018, pp. 1316-1324.
Xu, et al., "Show, attend and tell: Neural image caption generation with visual attention.", In Proceedings of the 32nd International Conference on Machine Learning, Jun. 1, 2015, 10 Pages.
Zhang, et al., "mixup: Beyond empirical risk minimization", In Repository of arXiv:1710.09412v1, Oct. 25, 2017, pp. 1-11.
Zhao, et al., "The sound of pixels", In Proceedings of the European conference on computer vision, Sep. 8, 2018, pp. 1-17.
Zhou, et al., "Visual to sound: Generating natural sound for videos in the wild", In Proceedings of the IEEE Conference on Computer Vision and Pattern Recognition, Jun. 18, 2018, pp. 3550-3558.
Zhu, et al., "Unpaired Image-To-Image Translation Using Cycle-Consistent Adversarial Networks", In Proceedings of the IEEE International Conference on Computer Vision, Oct. 22, 2017, pp. 2223-2232.
Ephrat, et al., "Improved Speech Reconstruction from Silent Video", In Proceedings of the IEEE International Conference on Computer Vision, Oct. 22, 2017, pp. 455-462.
Fang, et al., "Facial expression GAN for voice-driven face generation", In Journal of the Visual Computer, vol. 38, Issue 3, Feb. 22, 2021, pp. 1151-1164.

(56) References Cited

OTHER PUBLICATIONS

Kumar, et al., "Robust One Shot Audio to Video Generation", In Proceedings of the 2020 IEEE/CVF Conference on Computer Vision and Pattern Recognition Workshops, Jun. 14, 2020, pp. 3334-3343.
Ma, et al., "Unpaired Image-to-Speech Synthesis With Multimodal Information Bottleneck", In Proceedings of the IEEE/CVF International Conference on Computer Vision, Oct. 27, 2019, pp. 7597-7606.
"International Search Report and Written Opinion Issued in PCT Application No. PCT/US22/023206", dated Jul. 4, 2022, 11 Pages.
Zhang, et al., "AudioViewer: Learning to Visualize Sound", In repository of arXiv:2012.13341v3, Mar. 11, 2021, 15 Pages.

\* cited by examiner

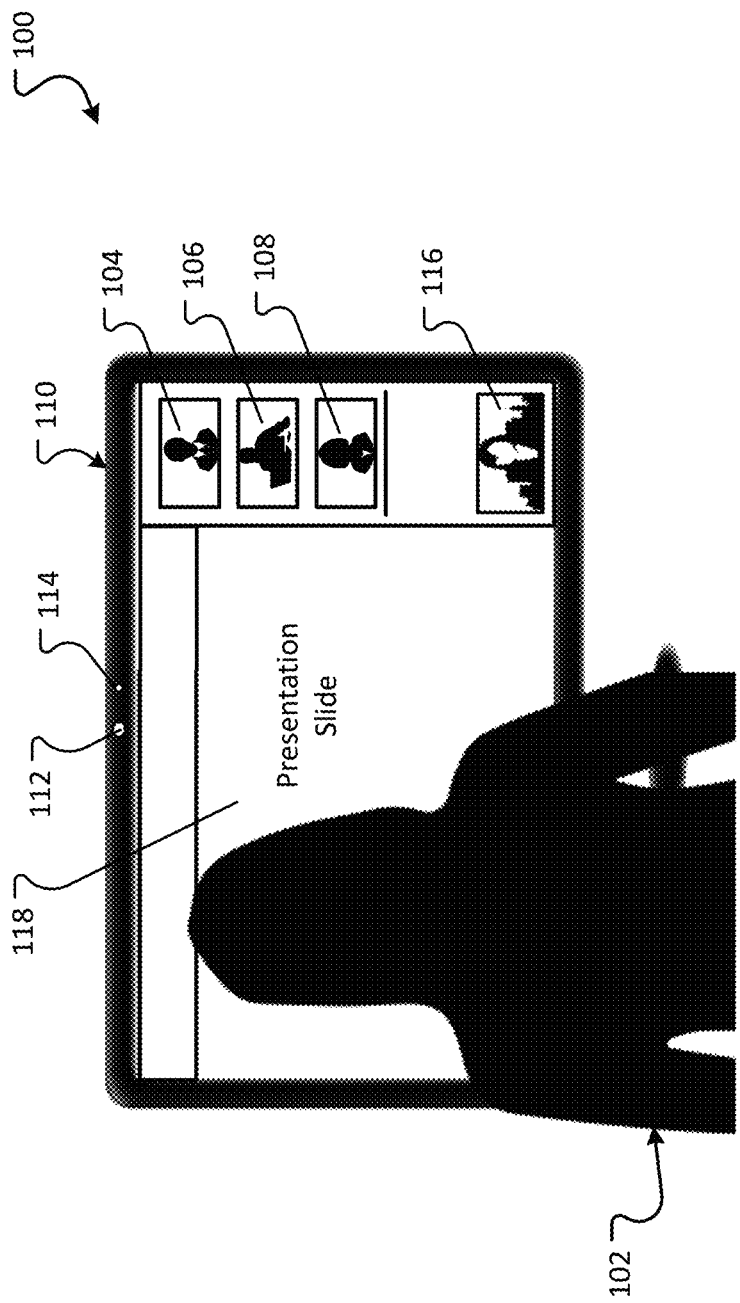

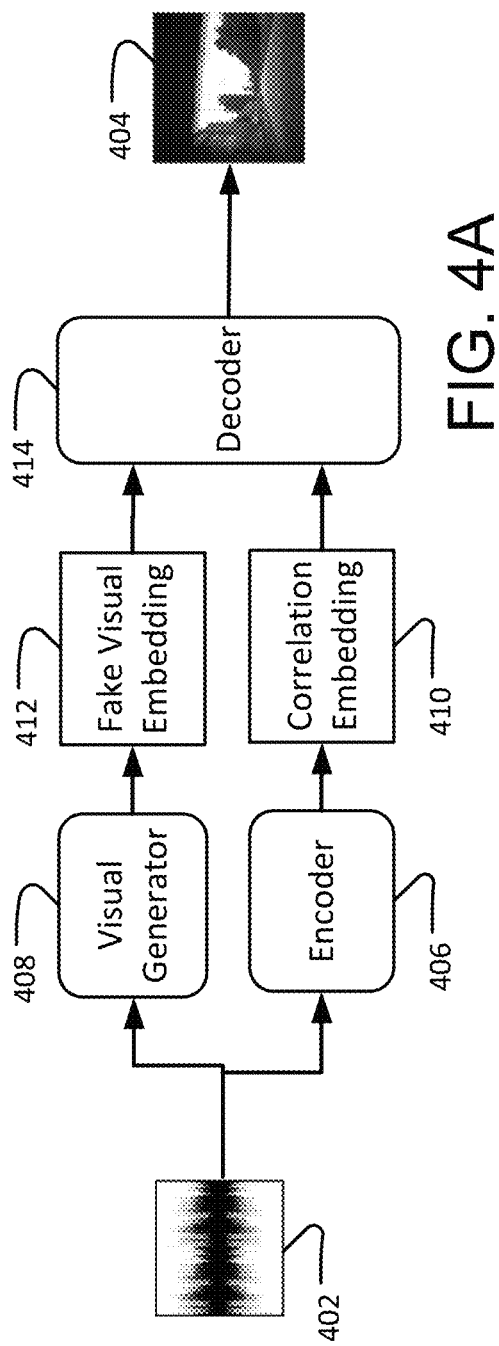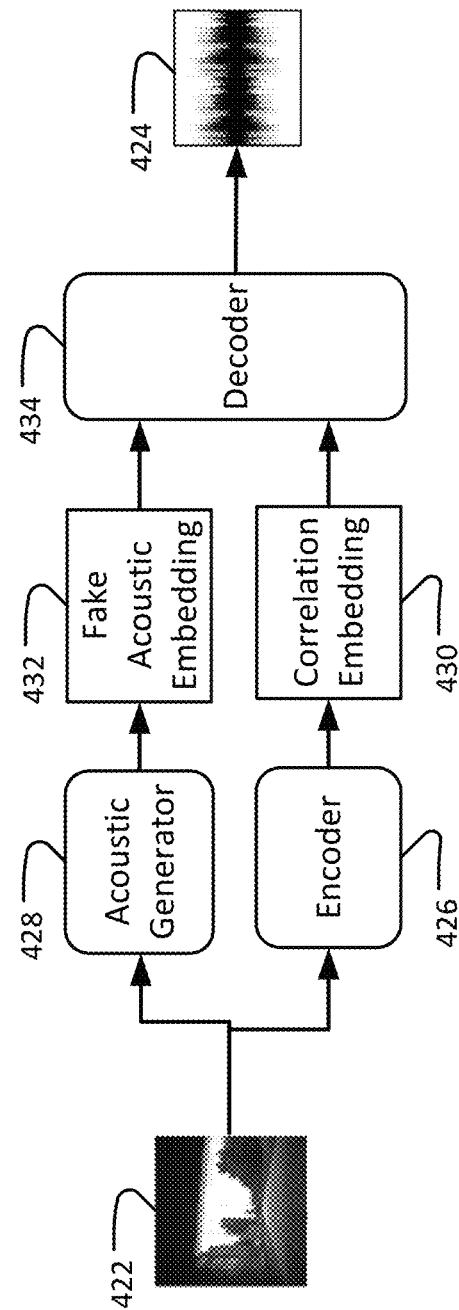

ENHANCED USER EXPERIENCE THROUGH BI-DIRECTIONAL AUDIO AND VISUAL SIGNAL GENERATION

BACKGROUND

With the increase in popularity of alternate reality or virtual reality systems, and the increased use of virtual backgrounds in such environments as video conferencing, there is an increased need to generate audio signals to accompany visual images and vice versa. With respect to video conferencing, the need is increased as users desire to protect their privacy while maintaining a semblance of reality. Generating an image from an audio signal and/or the creation of an audio track given an image or series of images is challenging due to the different modalities in information. Image information includes spatial information and color information which cannot be represented by a single channel audio recording. Likewise, audio or acoustic information includes temporal information which cannot be represented in a single frame or image.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to creating receiving a signal or other information in a first modality, such as a sound signal or a visual image and translating that received signal to an output signal in the other modality. Therefore, aspects of the present disclosure relate to creating/translating a received sound file or recording into an output visual image or set of images.

In aspects of the disclosure, systems and methods are described for use on a user device or computer with a display and audio output. The systems and methods include functionality for receiving the input signal in a first modality; encoding the input signal; translating or decoding the input signal to a second encoded signal, the translation using a trained model wherein the trained model is trained based on visual signals, augmented visual signals, audio signals and augmented audio signals; decoding the second encoded signal to create the output signal, the output signal of a second modality which is different than the first modality; and presenting output signal in connection with the input signal. In aspects, training the model involves using a first pair of visual and audio networks to train a set of codebooks using the visual signals and the audio signals and using a second pair of visual and audio networks to further train the set of codebooks using the augmented visual signals and the augmented audio signals. Further, the first and the second visual networks are equally weighted and where the first and the second audio networks are equally weighted. In aspects of the present disclosure, the set of codebooks comprise a visual codebook, an audio codebook and a correlation codebook.

In accordance with other aspects of the present disclosure, a computer readable medium is used for storing computer-executable instructions that when executed by a processor cause a computer system to receive a video signal having at least two correlated signals, wherein the correlated signals are of different modality and wherein the at least two signals comprise a visual signal and an audio signal; extract the visual signal and provide the visual signal to a first visual encoder; augment the visual signal and provide the augmented visual signal to a second visual encoder; extract the audio signal and provide the audio signal to the first audio encoder; augment the audio signal and provide the augmented audio signal to the second audio encoder; train a visual codebook related to the visual embeddings in the visual signal and the augmented visual signal; train an audio codebook related to the audio embeddings in the audio signal and the augmented audio signal; train a correlation codebook related to the correlations between the visual signal, the augmented visual signal, the audio signal and the augmented audio signal; and supply the trained visual codebook, audio codebook and correlation codebook to a trained model for translating a first signal in first modality to second signal in a second modality.

According to yet other aspects, the computer the first and second visual encoders share the same structure and weight and wherein the first and second audio encoders share the same structure and weight. Also, in embodiments the augmented the augmented video signal is a flipped version of the video signal and the augmented audio signal comprises the audio signal with more or less noise than the audio signal.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 1A illustrates an exemplary environment in which embodiments described herein may be used.

FIGS. 4A and 4B are block diagrams illustrating more detailed functional components of the translation components according to aspects described herein.

DETAILED DESCRIPTION

Figure 1B:
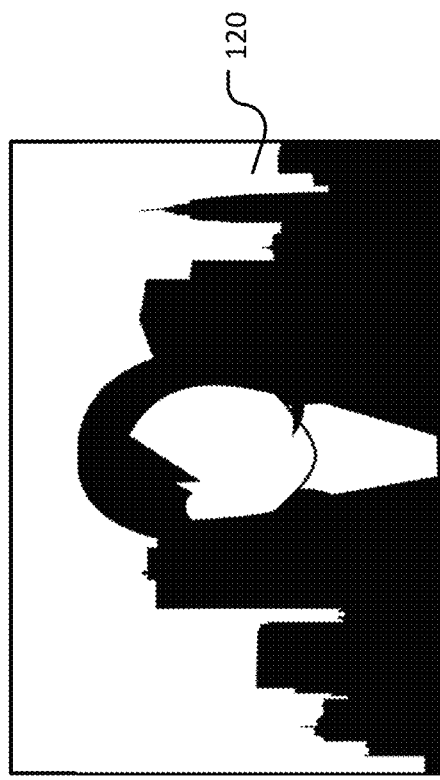
FIGS. 1B-1D illustrate exemplary backgrounds that may be actual backgrounds or virtual backgrounds in accordance with aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, different signals are received that are either visual signals such as the images (which could be one or more frame images of a video), or audio signals (such as a plurality of seconds of an audio recording). The signals are then processed to create or otherwise generate signals to complement the received signal(s). As an example, if an image is received by a system described herein of a beach scene, the system processes the image in such a way as to create an audio signal to complement or otherwise coincide with the beach image such as ocean wave sounds. As a similar example, if the system receives an audio clip of ocean waves then, as described in detail below, the system may create an image or series of images representing a beach scene that complement the audio clip.

Generating an image from an audio recording and vice versa is accomplished using methods and systems described herein despite the different modalities in information. As discussed below, the process of audio-image bi-directional translation involves at least two process steps. First, embodiments of the invention involve a step of learning the "correlation" between audio and visual information. The learning aspect involves the designing and training a deep neural network, such as a Siamese Variational Auto-Encoder network (also referred to as a "SVAE network") to estimate the correlation of different audio signals to visual information and vice versa. In essence the deep neural network is used to create and fine tune three separate codebooks, one for visual embedding, one for audio embedding and one for correlation embedding. The codebooks are then used with the visual generator and/or acoustic generator in combination with an input signal to create corresponding output signal.

In a particular embodiment, the training of the deep neural network involves the use of millions of videos from a video database (such as the YouTube® database). To aide in the training, the videos may be pre-filtered based on scene categories. With the correlation representation or codebook, along with the output of the visual generator (when converting from audio to visual) or the output of the acoustic generator (when converting from visual to audio), images and recordings can be generated using the decoder of the SVAE network. Consequently, systems and methods discussed herein can generate high-quality images from audio recordings and plausible scene sounds from visual images.

FIG. 1A illustrates an exemplary use case and environment for embodiments of the present invention where a user 102 displays/transmits background visual images and further transmits a corresponding audio signal associated with the transmitted visual images. In accordance with aspects of this disclosure, the audio signal is generated based on analysis of one or more of the images to be displayed. In accordance with other aspects, the images may be generated based on an analysis of the received and/or transmitted audio signals.

In a particular example depicted in FIG. 1A, a user 102 is engaged in a video conference call with other users 104, 106 and 108 using computing system 110. The computing system 110 may include an image sensor or camera 112 capable of acquiring one or more images of the user 102. The computing system 110 may further include an audio sensor or microphone 114 for acquiring sound or audio signals spoken by the user 102 and/or background sounds around the user 102. During the video conference call, as will be appreciated by those skilled in the art, the computer system receives the visual images and the audio sounds and transmits the same to other users 104, 106 and 108. Additionally, the video conference call may further display the user 102 as she appears to other users 104, 106, and 108 in a separate display area 116. That is, display area 116 provides the user 102 with a representation of the visual images presented on the computer systems of the other users 104, 106 and 108 as seen from the camera 112. If the user 102 has chosen a virtual background, as is known in the art, then the user 102 will be displayed in display area 116 with the chosen virtual background. As shown in FIG. 1A, the video conference may further be used to display presentation material in the main presentation area 118, if desired. Those skilled in the art will appreciate that many other configurations of video conferencing displays may also be used in accordance with aspects of the present disclosure.

Figure 1C:
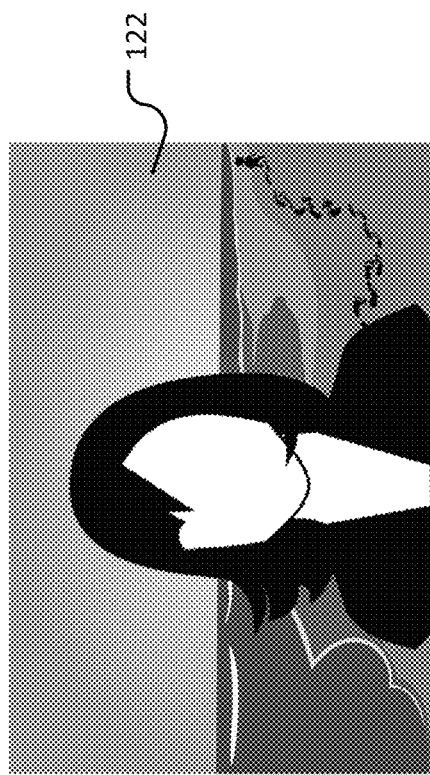
Figure 1D:
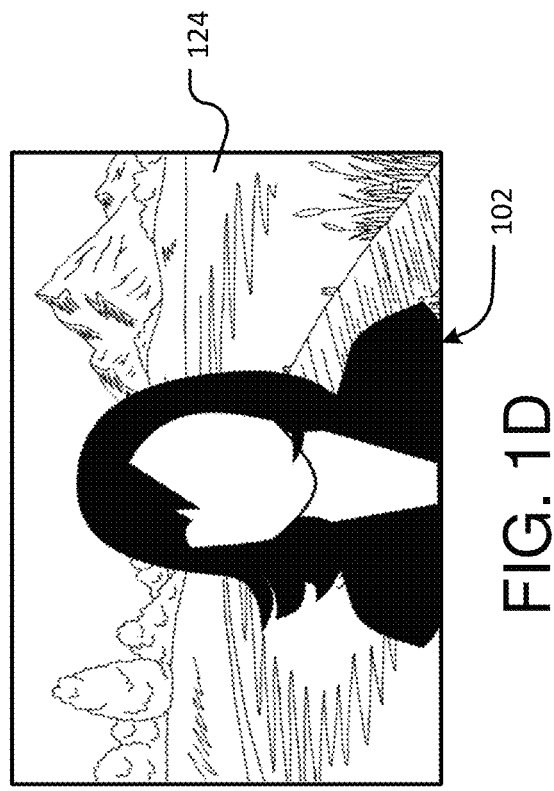

FIGS. 1B-1D illustrate the user 102 showing different backgrounds. For example, FIG. 1B displays the user 102 with a cityscape background 120. FIG. 1C displays the user 102 with a beach background 122 and FIG. 1D displays the user 102 with a lake and mountain background 124. As will be appreciated, the backgrounds 120, 122 and/or 124 may be the true background for user 102 depending on her physical location. Additionally, and in accordance with particular aspects of the present invention, when displaying one of these true backgrounds 120, 122 or 124, a synthesized audio signal is generated to correspond to the background, as discussed below.

In accordance with other particular aspects of this disclosure, it is also contemplated that the backgrounds 120, 122 or 124 could instead be virtual backgrounds, e.g., not the actual background of the user 102, but instead a background image (or series of images) synthesized based on received audio signal. The received audio signal may be the true or live audio signal for the user, e.g., the natural or true sounds of their location, but the image may be generated using aspects of the present disclosure. As a particular example, the user 102 may be near a beach in actuality, but instead of showing the actual beach, a synthesized beach scene 122 may be created, without some specific items, e.g., people or litter, etc. The ability to synthesize and integrate images based on sound or sound based on images gives the user an enhanced experience in controlling aspects presented to other users while maintaining high levels of realism.

Figure 2:
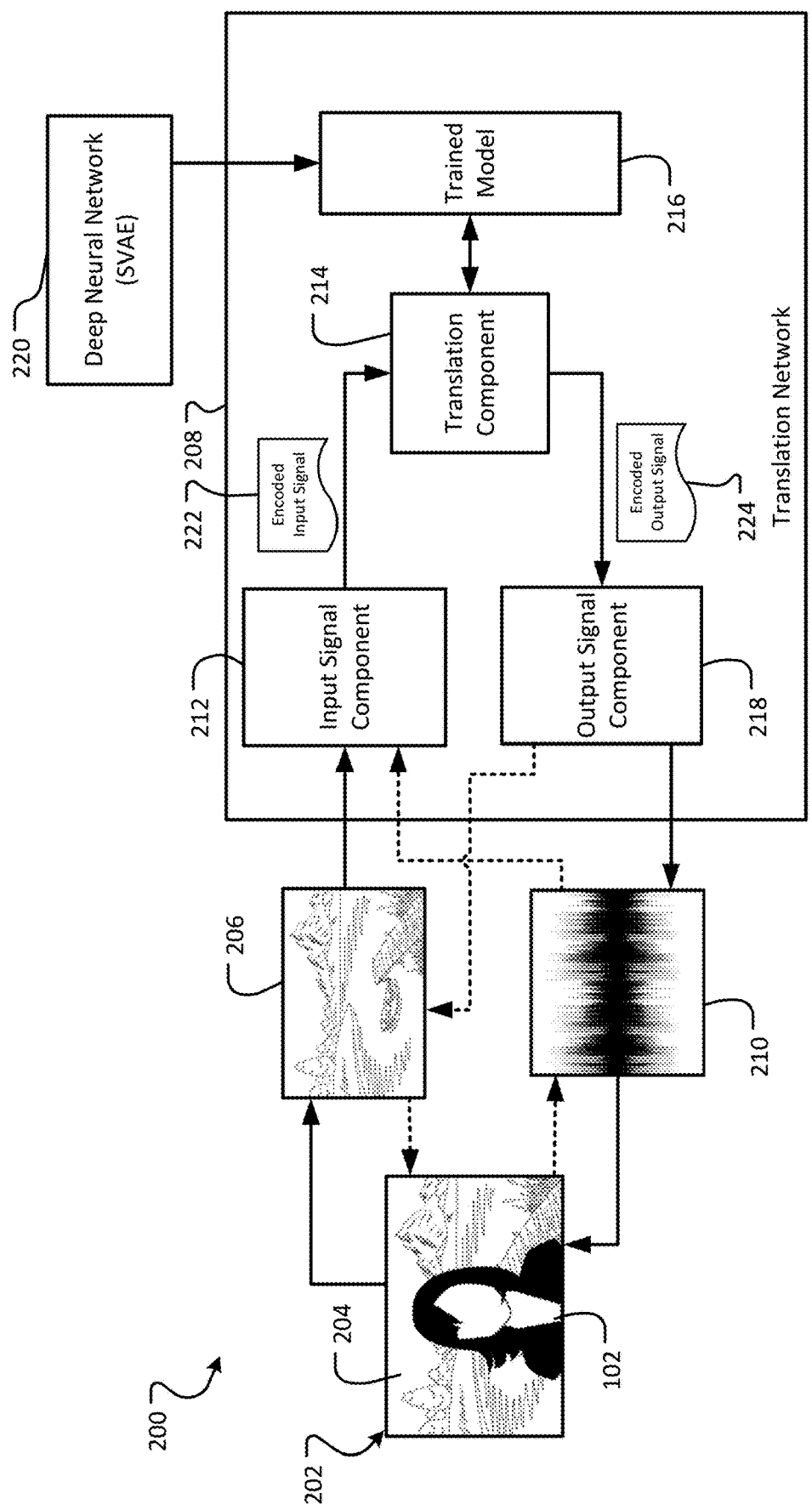
FIG. 2 is a block diagram illustrating exemplary functional components of an embodiment showing the translation of a first signal of a first modality, such as a visual image or an audio recording to a second signal of a second modality, such as to an audio recording or to a visual image, respectively, according to aspects described herein.

FIG. 2 further illustrates an example and other aspects of embodiments of this disclosure. As shown, user display 202 displays user 102 (e.g., user 102 from FIGS. 1A-1D) with a particular background 204. In this example, the background 204 is one of nature, with a lake, a pier, and a mountain further in the background. For the purposes this example, the background 204 may be the true background of the user 102. In embodiments, a snapshot image 206 of the true background 204 may be captured and provided to the translation network 208. The translation network 208 can create and return an audio clip or recording 210 related to the input image 206. Consequently, while the user 102 is on a video conference displaying her true background behind her, she can supplement or provide background sounds generated by the translation network 208.

The translation network comprises an input signal component 212 for receiving the input signal 206. The input signal component may include an encoder for encoding the signal into an encoded input signal 222, e.g., a digital vector quantization signal or another known encoded signal. The encoding of encoded input signal 222 allows for storage and analysis of the received signal. The input signal component 212 may then transfer the encoded signal to a translation component 214 which translates the input signal 212 into an encoded output signal 224 which corresponds to a new signal, the new signal being of different modality from input signal 206, such as output signal 210. In an embodiment, the translation component 214 translates the encoded information received from input signal component 212 into an encoded output signal 224 and delivers the intermediate output signal to the output signal component 218 for decoding. The output signal component 218 decodes the encoded output signal 224 received from the translation component to create the output signal 210.

The translation component 214 uses a trained model 216 to translate the encoded input signal 222 to the encoded output signal 224 and communicates the encoded output signal 224 to an output signal component 218. Output signal component decodes the encoded output signal 224 to create the output signal 210 for display on user display 202. The trained model 216 is trained using a deep neural network 220, as discussed in more detail below.

In other embodiments, as may be appreciated by those skilled in the art, and from the considering dotted lines in FIG. 2, the signal 210 may be input into the input signal component 212. In such an example, the audio signal 210 in FIG. 2 is representing the true sound or an audio clip chosen by the user 102 to have translated into a visual image or set of visual images. In such an example, the encoded input signal 222 represents the encoded version of the audio signal 210 and is translated to an encoded version of an output visual image 224 by the translation component 214. The dotted lines depict this alternative translation where the output signal 206 is created by the translation network 208 and displayed on user display 202. In such an example, the user's background image may be synthesized to correlate to the true and/or chosen audio signal 210. Consequently, the translation network 208 is considered bi-directional given that it can create a visual image 206 from a given audio signal 210 or create an audio signal 210 from a given visual signal 206.

To create the audio signal 210 from the visual image 206 and/or create the visual image from the audio signal, a deep neural network 220 is initially used to create trained model 216. The deep neural network 220 may be a Siamese Variational Auto-Encoder network, and is therefore sometimes referred to herein as a "SVAE" network. In training, the deep neural network 220 consumes a large database of videos, where the videos comprise correlated audio signals and visual images. In accordance with aspects of the present disclosure, the training of the deep neural network 220 is designed to separate correlation information between the audio and visual signals. In embodiments, the system introduces at least one Siamese network, where the Siamese network comprises two Vector Quantization Variational Auto-Encoder ("VQ-VAE") networks, which share weights and correlation codebooks. The two VQ-VAE networks operate in parallel on different but related inputs to determine correlations between audio and visual signals as discussed in conjunction with FIG. 3. In embodiments, one Siamese network is used to for visual signals and a second Siamese network is used for audio signals.

Figure 3:
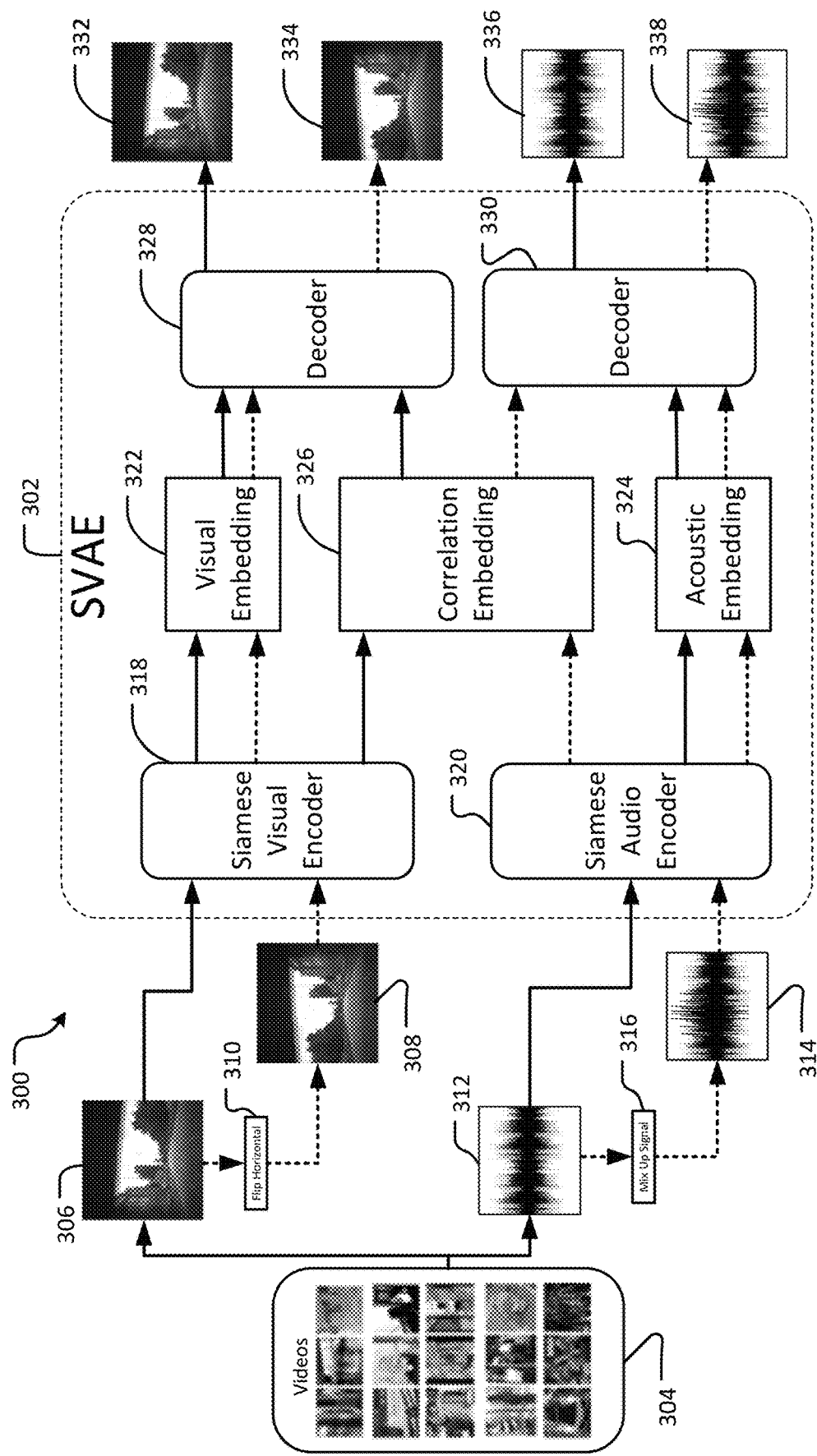
FIG. 3 is a block diagram illustrating exemplary more detailed functional components of the encoder/decoder correlation network for training a model according to aspects described herein.

FIG. 3 illustrates a block diagram 300 of exemplary functional components of an SVAE network 302 according to aspects described herein. The SVAE network 302 is trained, according to certain embodiments, using a large database of videos, represented by 304. The video information is fed into the SVAE network 302 to determine correlation information between visual information and audio information and train codebooks related to this evaluated information. In essence, each video signal has at least two correlated signals, e.g., audio and video, wherein the correlated signals are of different modality. During a preliminary step the visual signal 306 is extracted from a video signal for delivery to the SVAE network 302. Also, augmented visual signal 308 also created to also be delivered to the SVAE network.

The visual signal 306 and augmented visual signal 308 are related images, where the augmented visual signal 308 is simply a flipped representation of the visual signal 306. The process of flipping the visual information is represented by block 310. The related visual signal 306 and the augmented visual image 308 are provided as input information to the SVAE network 302 as shown in FIG. 3.

Additionally, the system 300 further uses correlated audio signals, such as the original audio signal 312 and augmented audio signal 314 as further inputs to the SVAE network 302. The audio signal 312 represents the audio signal that correlates to the image 306 in that it is the audio signal from the video associated with the visual image 306 from a particular video segment. The augmented audio signal 314 is related to the audio signal 312 where it has gone through a mix-up process 316 to add or remove background noise. Each audio signal may or may not be further represented as a log-mel or frequency based representation, which is not shown, but which is known by those skilled in the art. The audio signals 312 and 314 are further provided as inputs to the SVAE network 302.

The SVAE network 302 comprises two encoders, including a Siamese visual encoder 318 and a Siamese audio encoder 320. Siamese encoder 318, which is essentially a pair of equally weighted encoder networks, receives and encodes the un-augmented input visual signal 306 and augmented visual signal 308. Siamese encoder 320, on the other hand, receives and encodes the audio signal 312 and the augmented audio signal 314. Siamese encoder 320 is essentially also a pair of equally weighted encoder networks for encoding the audio signals. Siamese encoder 318 encodes received signals and passes the visual encoding results to a visual embedding process 322. The visual embedding process is thus able to evaluate and determine spatial information between objects based on the analysis of the two encoded visual image signals 306 and 308. Likewise, Siamese encoder 320 encodes received audio signals 312 and 314, respectively and passes the audio encoding results to an audio embedding process 324. The audio embedding process evaluates the signals for temporal information based on the analysis of the two encoded audio signals 312 and 314. Additionally, the results of both Siamese encoders 318 and 320 are passed to a correlation embedding process 322. The correlation embedding process determines correlation information as between the audio and video signals.

Upon determining the visual embedding 322, the acoustic embedding 324 and the correlation embedding 326, codebooks may be trained with these embeddings and which can be used to decode input signals. Decoder 328 comprises the visual decoder and visual generator components to create an image based on the received input from visual embedding 322 and the correlation embedding 326. The results of decoder 328 are depicted as the decoded image 332 related to (or decoded from) image 306 and decoded flipped image 334 related to (or decoded from) flipped image 308. As may be appreciated the decoded image 332 and decoded flipped image 334 may be fuzzier than the originals due to loss values in the encoding and decoding operations. As may also be appreciated, during training, analysis of the output signals 332, 334, 336 and 338 will allow for tweaking the loss values of the above equations Decoder 330 comprises the audio decoder and audio generator components to create the output audio signal 336 and 338 based on the received input from audio embedding 324 and the correlation embedding 326. The decoder 330 may generate audio signal 336 based on the original audio signal 312. The decoder may also generate audio signal 338 based on the original, mixed up signal 314. As may be appreciated audio signals 336 and 338 may not be as clear as the originals 312 and 314 due to loss values in the encoding and decoding operations.

One goal of the SVAE network 302 is to estimate the correlation representation of the training data 304 or, more specifically, the correlation of the audio-visual pairs provided by a training data 304. More specifically, the following equations are provided to better explain the operations of the SVAE network 302. For each of the audio-visual pairs, the audio input is represented in the following equations as xa and the visual image is shown as xv. The encoder E(x) is a non-linear mapping from the input space, x (xa or xv), to the visual vector a, acoustic vector v and correlation vector c. These vectors are then quantized based on three distances to the prototype vectors in visual codebook V(.), acoustic codebook A(.) and correlation codebook C(.), respectively. The quantized vectors are visual embedding ev, acoustic embedding ea and correlation embedding ec. A decoder D(.) of the VAE network reconstructs the input x'(x'a or x'v) based on these three features. Moreover, the encoder and decoder can be trained as a reconstruction task.

As may be appreciated, the SVAE network is designed to better separate these features during the training phase, i.e., the visual embedding, the acoustic embedding and the correlation embedding. If these three features lack constraints, there would be too many possibilities for combinations of their codebooks, making training unstable. To address this problem, the SVAE network 302 incorporates the second VAE network, which includes the separate encoder 320 and uses augmented signals, comprising mixed audio $\hat{x}\alpha$ 314 and flipped images $\hat{x}v$ 308. The flipped images 308 and the original images 306 have the same objects with different spatial information. The augmented audio signal 314 and the original audio 312 have a similar background sound with the different temporal information, e.g., noise has been added or removed from the original audio signal. The augmented signals 308 and 314 add constraints to the visual and audio codebooks during the training process. The augmented audio-visual pairs are the input of the other VAE network. This second network and the original VAE network (which includes the Siamese encoder 318) whose input is the original audio-visual pairs have the same structure and share weights, so called Siamese VAE, as shown in FIG. 3. Consequently, the separation of the features reduces to maximizing the distance of the visual/acoustic representations of original signals (306 and 312) and augmented signals (308 and 314) and minimizing the distance of the correlation of the same. The following equations illustrate the different aspects of the SVAE 302.

$$L = (xv, xa) + R(\hat{x}v, \hat{x}a) + \|C(xv) - C(xa)\| + \theta D(xv, xa, \hat{x}v, \hat{x}a) \quad \text{[Equation 1]}$$

$$R(xv, xa) = \|xv - x'v\|_2^2 + \|xa - x'a\|_2^2 + \|sg(a) - ea\|_2^2 + \quad \text{[Equation 2]}$$
$$\|sg(v) - ev\|_2^2 + \|sg(c) - ec\|_2^2 + \beta\|ea(x) - sg(ea)\|_2^2 +$$
$$\beta\|ev(x) - sg(ev)\|_2^2 + \beta\|ec(x) - sg(ec)\|_2^2$$

$$D(xv, xa, \hat{x}v, \hat{x}a) = \frac{1}{e^{\|V(xv)-V(\hat{x}v)\| + \|A(xa)-A(\hat{x}a)\|} + 1} \quad \text{[Equation 3]}$$

Equation 1 specifies the objective function and Equations 2 and 3 provide more specific definitions of R (xv, xα) and D (xv, xα, $\hat{x}$v, $\hat{x}$α), respectively. With respect to Equation 1, it has six components that are used to train the SVAE. The reconstructed data values, as vectors, may be represented as V(xv), V(xα), V($\hat{x}$v) and V($\hat{x}$α). The first two terms are the VQ-VAE loss, which includes reconstruction loss, codebook loss and commitment loss where the operator sg refers to a stop-gradient operation blocking gradients from flowing into its argument, and is a hyperparameter which controls the reluctance to change the code corresponding to the encoder output. The third term in Equation 1 is the correlation loss, which optimizes visual encoder and acoustic encoder to get a similar correlation representation. The fourth term θD (xv, xα, $\hat{x}$v, $\hat{x}$α) is the difference loss, which optimizes visual encoder and acoustic encoder to get the different representation for the original input and augmented input. In some experiments, variables were set as follows: β=0:25 and θ=2. Although in general, this would depend on the scale of reconstruction loss and difference loss.

After training SVAE, in accordance with certain embodiments, an extra categorical generator model is then trained. In certain embodiments, a GAN loss may be used, which is known in the art, may be used over the discrete representation, e.g., the input audio signal or input visual signal to ensure that generated signals are similar to real signals. For the visual generator, the representation input is the acoustic spectrum, and the eight full-connection layers are replaced by the encoder of a WaveNet. For the acoustic generator, the representation input is the input image, and the down-sampling layers are added at the front of the eight full-connection layers.

The functional components for translating an input audio signal 402 to a generated output image 404 are shown in FIG. 4A. For such audio-to-image translation task, the input is an audio recording or audio signal 402. The audio signal 402 may be live signal or sampled portion of a live signal. The audio signal 402 is input into encoder 406 and visual generator 408. The encoder 406 is similar to the one of the encoders in the Siamese encoder 318 described above in conjunction with FIG. 3. The output of the encoder 406, is, in some embodiments a vector of values related to the input audio signal 402. The encoded vector is evaluated against correlation embedding 410 to determine a related or closely related visual embedding. In essence, the vector may be evaluated against the correlation embedding for determining potential corresponding video elements that correlate with the audio signal 402. Meanwhile, the audio signal 402 is also used by the visual generator 408 to translate the audio signal to potential video values. These potential video values are the fake visual embeddings 412. In an embodiment, the system implements a GAN loss function to ensure the fake visual embedding is close to a real visual embedding. The fake visual embedding output, along with the correlation embedding output are sent to the decoder 414. The decoder 414 generates the generated output image 404 using the two input video vectors from the fake visual embedding component 412 and the correlation embedding component 410. The decoder creates the output signal 404 from these inputs.

The functional components for translating an input visual image 422 to a generated output audio signal 424 are shown in FIG. 4B. For such image-to-audio translation task, the input is a visual signal 422. The visual signal 422 may be live or true visual signal from a camera or sampled portion of a live signal. The visual signal 422 is input into encoder 426 and acoustic generator 428. The encoder 426 is similar to one of the encoders within the Siamese encoder 318 described above in conjunction with FIG. 3. The output of the encoder 426, is, in some embodiments a vector of values related to the input visual signal 422. The encoded vector is evaluated against correlation embedding 430 to determine a related or closely related visual embedding. In essence, the vector may be evaluated against the correlation embedding for determining potential corresponding audio elements that correlate with the audio signal 402. Meanwhile, the visual signal 422 is also used by the acoustic generator 428 to translate the visual signal to potential audio values. These potential audio values are the fake audio embeddings 432. In an embodiment, the system implements a GAN loss function to ensure the fake audio embedding is close to a real audio embedding. The fake audio embedding output, along with the correlation embedding output are sent to the decoder 434. The decoder 434 generates the generated output audio signal 424 using the two input audio vectors from the fake audio embedding component 432 and the correlation embedding component 430. The decoder creates the output audio signal 424 from these inputs.

Figure 5:
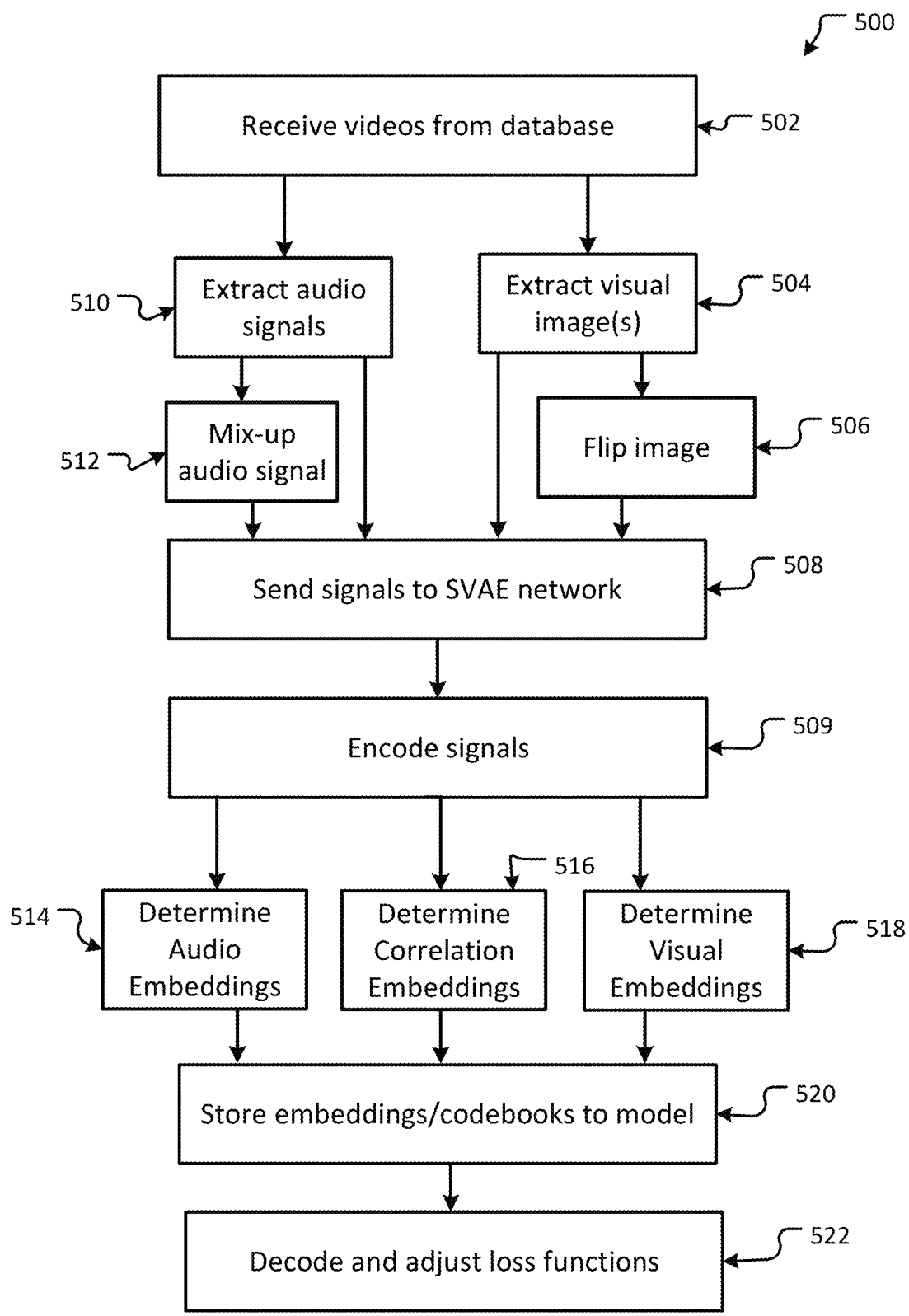
FIG. 5 illustrates an overview of an example method for training a model using two networks according to aspects described herein.

FIG. 5 illustrates an overview of an example method for training a model using two networks, such as Siamese VQ-VAE networks. As an initial step, the system receives videos from database at operation 502. In essence, the system is trained by evaluating or consuming a very large amount of video information where the audio and visual signals have some correlation. In a particular embodiment, the system is trained on a subset of the Youtube® 8M dataset, which consists of many different kinds of scenes. In a particular embodiment, the scenes may be filtered to better train the model for those specific scenes. Typical scenes may include the following types of scenes: Airports, Buses, Street pedestrians, Parks, Metro areas, Street traffic, Shopping malls, Public Squares, Metro Stations and Trams.

From the videos, the visual images are then extracted at extract operation 504. In a particular embodiment, the image size extracted is 512×512. Following extraction of the visual images at extract operation 504 a flip image process step 506 is used to create an augmented image related to the extracted image. The two images from 504 and 506 are then passed to the SVAE network at operation 508.

Meanwhile, while the visual information is extracted from the video, extract audio signal operation 510 extracts the corresponding audio signal related to a particular visual image. The extracted audio signal is passed to the SVAE network at operation 508 as well. Further, mix-up audio signal 512 adds or removes background noise from the extracted audio signal to create a related, but augmented audio signal and sends it to the SVAE network at operation 508. In specific examples, the audio signals are ten seconds in length and the audio waveform is re-sampled at 16 kHz.

The input signals (the visual image, the augmented visual image, the audio signal and the augmented audio signal) are then encoded at encode operation 509 by two, equally weighted neural networks. The encoding process involves determining vector values for the for the input signals. In an embodiment, VQ-VAE networks are used. The equations described above, e.g., Equation 1, Equation 2 and Equation 3 are used in the encoding step.

Once encoded, the process flow 500 then determine the embeddings in the input signals. Determine audio embeddings 514 determines the audio codebook, determine correlation embeddings 516 determines the correlation embeddings, and determine visual embeddings 518 determines the visual embeddings in the provided encoded signals. The embeddings are used to train three codebooks for the visual information, the audio information and the correlation information.

Once the embeddings are determined, store operation 520 stores the different embeddings and/or codebooks to a trained mode. The trained model being usable with a translation network, such as translation network 208 (FIG. 2) to aide in translating an image to an audio signal or an audio signal to an image.

Next, decode operation 522 provides for the ability, during training, to evaluate the output or decoded versions of the input signals. The decoding will further provide for the ability to adjust loss functions within the encoding steps to fine tune the output or decoded signals. That is, during training, an input visual signal has a known, correlated audio signal such that the generated output signal from the SVAE network can be compared against the true audio signal and adjustments can be made. Likewise, an input audio signal has a correlated visual image that can be used to compare against the generated visual signal to determine the similarities and improve upon the same.

In a specific embodiment related to embodiments described herein, the training, validation and testing data included 14K videos, 2K videos and 1K videos. The total length of video time was 472 hours. Further, various known networks could be used, such as "Keras" networks and "TensorFlow" networks. In on example, an "ADAM" optimization was used as an optimizer with β1=0.5, β2=0:0002, and the learning rate of 0:0002 and the batch size of 64 for 500000 epochs. The size of the representation (visual representation, acoustic representation and correlation representation) to 16*16*1. Therefore, the reduction for visual and acoustic information are $$\frac{512*512*3}{2*16*16*1} = 1536$$

in bits and $$\frac{640*64*1}{2*16*16*1} = 80$$

in bits, respectively.

Figure 6:
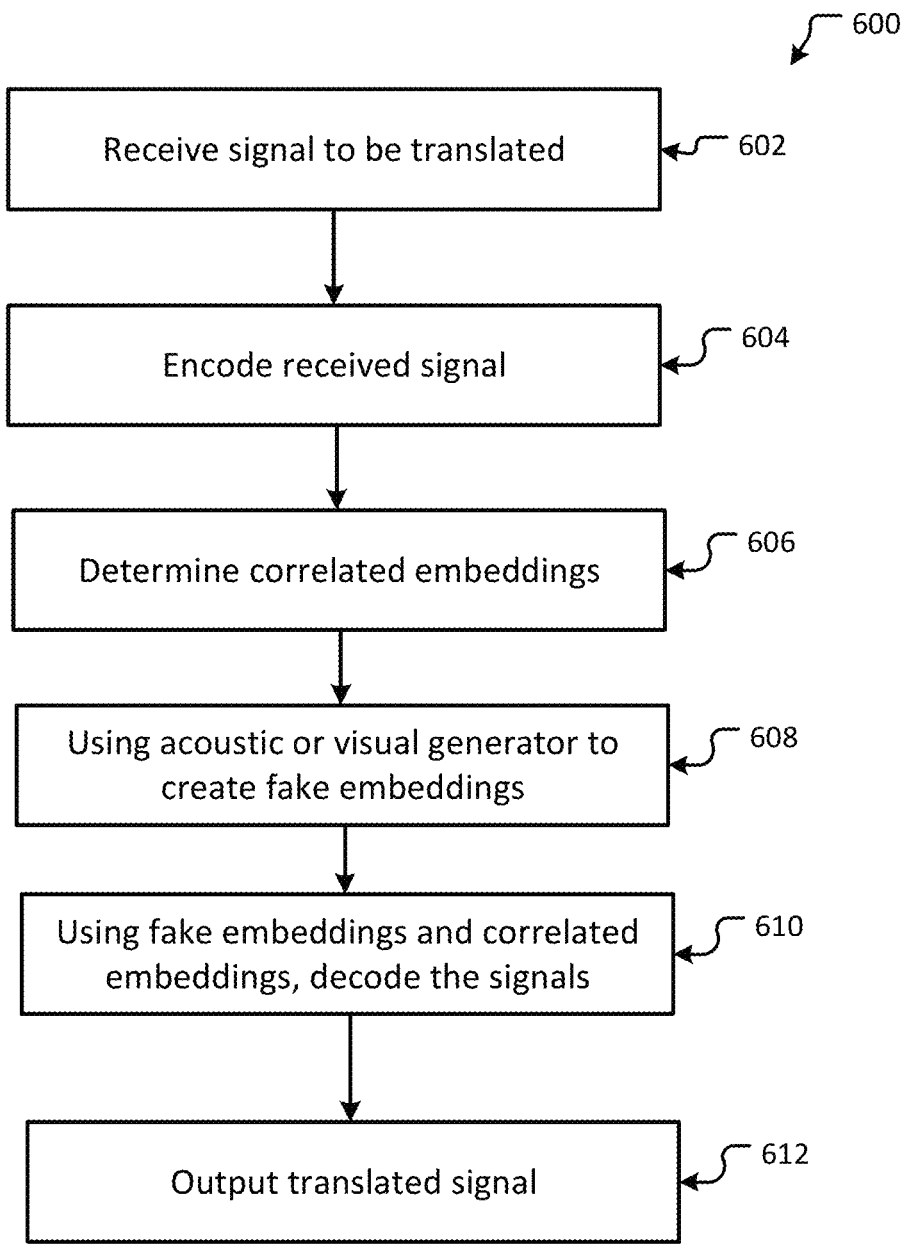
FIG. 6 illustrates an overview of an example method for generating a signal in a particular modality from a received signal in a different modality.

FIG. 6 illustrates an overview of an example method for generating a signal in a particular modality from a received signal in a different modality. The method 600 begins with receive operation 602 wherein the signal to be translated is received by the system. As discussed above, in embodiments, the input signal may be a visual signal, which is of a first modality (visual), or an audio signal, which is of a second modality (audio). In embodiments, method 600 is related to the creation of a new output signal in a different modality without having a control value, i.e., there is no correlated input signal of that different modality input with the received the signal.

Once the signal is received, it is encoded by encode operation 604. Encoding is, in examples, the process of determining a vector value for the input signal. The vector value may be determined by a vector quantization method. The encoding, in essence results in an array or vector of values that represents the input signal (whether audio of visual). As will be appreciated by those skilled in the art, the step of encoding an input signal per operation 604 is the same or substantially similar to the process steps described above with encoding audio and visual signals in order to train al model.

Once encoded, the method then determines correlated embeddings at determine step 606. The determination of correlated embeddings relate to evaluating the received encoded signal and matching the same to the most similar signal based on the trained model. The process may further calculate similar signals or potentially similar embeddings. The process enables the selection of corresponding known signal vectors related to those signals of the different modality. This step creates an output vector related to the expected correlated output signal of the different modality.

Meanwhile, an additional process operation receives the signal 602 and generates an intermediate or fake embedding value at operation 608. In essence, when translating an audio signal to a visual signal, or a visual signal to an audio signal, create operation 608 translates the initial signal to a vector value of the other signal type. The vector value is deemed a fake embedding in that it is an attempt, using GAN technology, to provide some evaluation of the data and output a signal in a different modality. The GAN technology itself does not use a trained codebook of correlation embeddings. The system implements a GAN loss function to ensure the fake embedding is similar to a real signals.

Next, decode operation 610, which receives both the output of the create fake embeddings step 610 and the determine correlated embeddings step 606, decodes the signals. Decode operation 610 is similar to the decode operation 522 described above in conjunction with FIG. 5 as it receives the vector values is able to create an output signal related to the encoded input values. A discriminator, not shown, may further be used to better determine the best output signal of different modality. Once decoded, output translated signal operation 612 outputs the signal, e.g., to an end user for presentation. In examples, the generated visual signal will be display in a synchronized manner with the audio signal. In other examples the generated audio signal will be played in conjunction with the input visual image(s).

Figure 7:
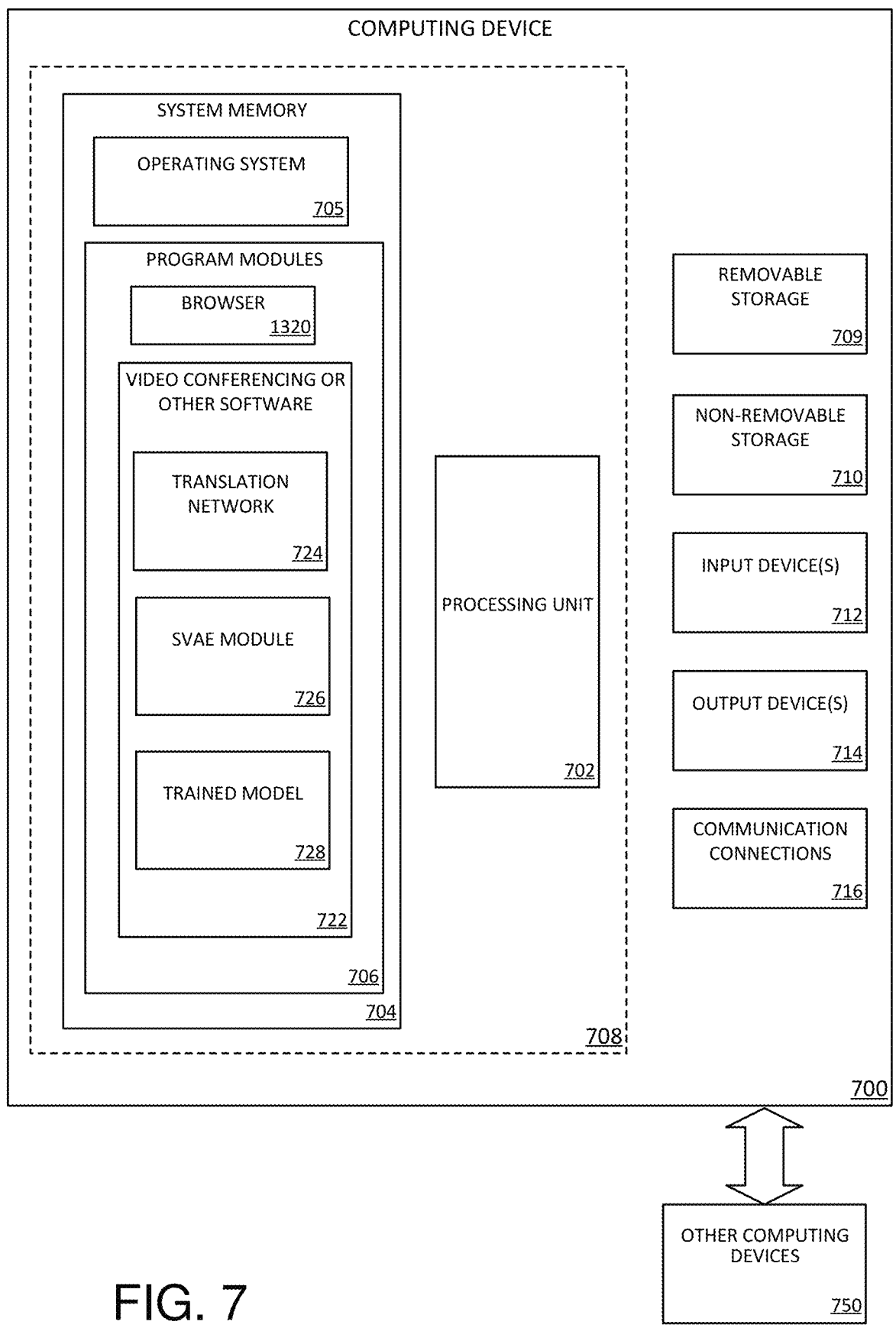
FIG. 7 is a block diagram illustrating example physical components of a computing device with which aspects of the disclosure may be practiced.
Figure 8:
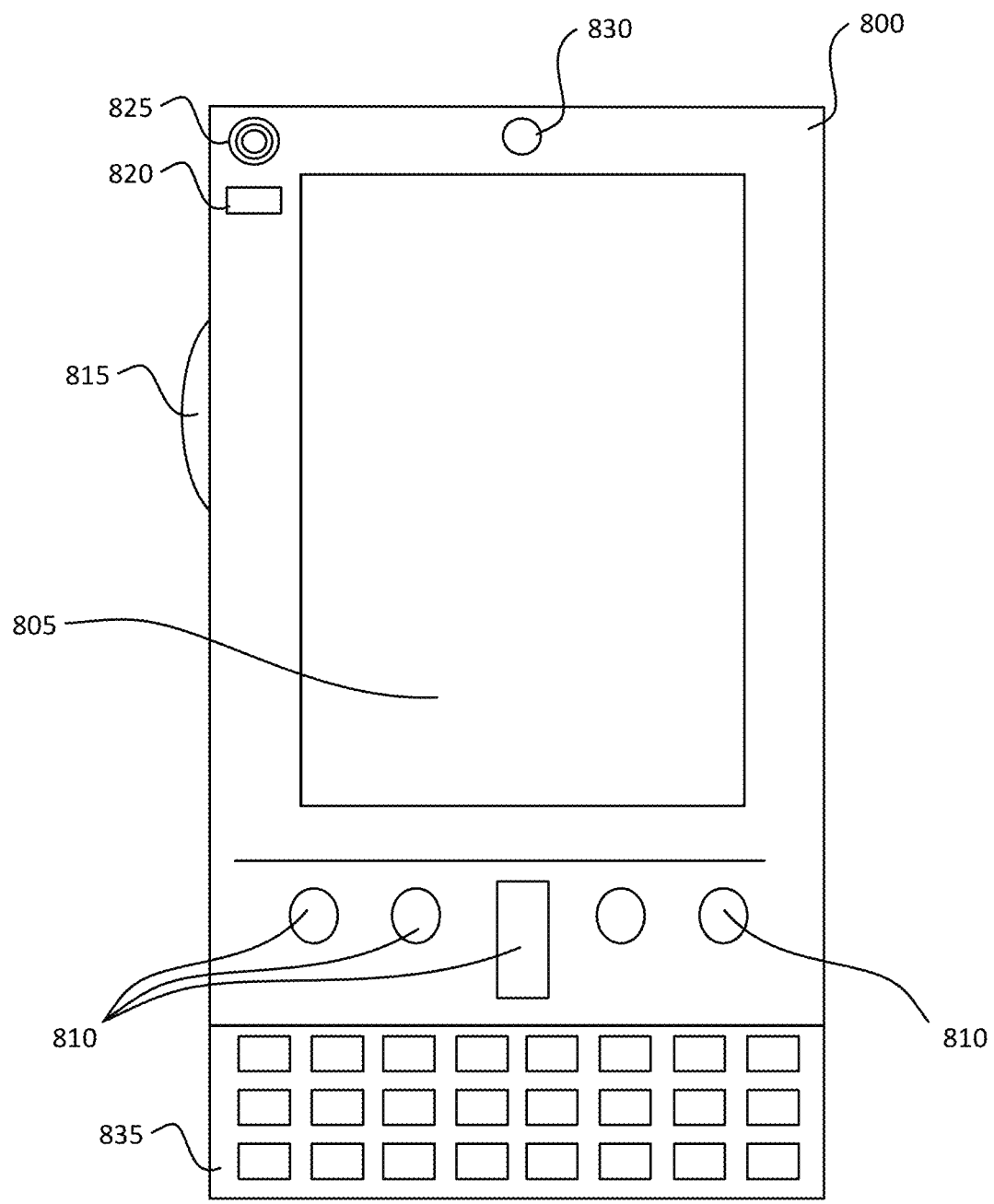
FIG. 8 illustrates a computing device for executing one or more aspects of the present disclosure.

FIGS. 7 and 8 and the associated descriptions provide a discussion of a variety of operating environments in which aspects of the disclosure may be practiced. However, the devices and systems illustrated and discussed with respect to FIGS. 7 and 8 are for purposes of example and illustration and are not limiting of a vast number of computing system configurations that may be utilized for practicing aspects of the disclosure described herein.

FIG. 7 is a block diagram illustrating physical components (e.g., hardware) of a computing system 700 with which aspects of the disclosure may be practiced. The computing system components described below may be suitable for the computing and/or processing devices described above. In a basic configuration, the computing system 700 includes at least one processing unit 702 and a system memory 704. Depending on the configuration and type of computing system, the system memory 704 may comprise, but is not limited to, volatile storage (e.g., random-access memory (RAM)), nonvolatile storage (e.g., read-only memory (ROM)), flash memory, or any combination of such memories.

The system memory 704 includes an operating system 705 and one or more program modules 706 for running software applications such as a browser 720 or video conferencing software 722, such as one or more components supported by the systems described herein. The operating system 705, may be suitable for controlling the operation of the computing system 700 and the system memory 704. The system memory 704 further includes a translation network 724, a SVAE module 726, and a trained model 728. The translation network may be the same as or similar to the translation network 208, as described above in conjunction with FIG. 2. The SVAE module 726 may be the same or similar to the network 220 or 302, as previously described. The trained model 728 may be the same or similar to the trained model 216 as previously described. Although shown in one computer system, such as computing system 700, it will be appreciated by those skilled in the art that the translation network 724, SVAE module 726 and the trained model 728 may be either in the same or in separate computer systems that may or may not be in communication with each other.

Furthermore, embodiments of the disclosure may be practiced in conjunction with a graphics library, other operating systems, or any other application program and are not limited to any particular application or system. This basic configuration is illustrated in FIG. 7 by those components within a dashed line 708. The computing system 700 may have additional features or functionality. For example, the computing system 700 includes additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files are stored in the system memory 704. While executing on the at least one processing unit 702, the program modules 706 (e.g., translation network 724, SVAE module 726 and trained model 728) perform processes including, but not limited to, the aspects as described herein. Other program modules that may be used in accordance with aspects of the present disclosure include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic element, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 are integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols is operated via application-specific logic integrated with other components of the computing system 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure are practiced within a general-purpose computer or in any other circuits or systems.

The computing system 700 can include or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing system 700 may include one or more communication connections 716, allowing communications with other computing systems 750. Examples of suitable communication connections 716 include, but are not limited to, radio frequency (RF) transmitter, receiver, and/or transceiver circuitry; universal serial bus (USB), parallel, and/or serial ports.

The term computer-readable media as used herein includes computer storage media. Computer storage media may include volatile and nonvolatile, removable, and non-removable media implemented in any method or technology to store information, such as computer-readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 700. Any such computer storage media may be part of the computing system 700. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

With reference to FIG. 8, an exemplary computing device 800 for implementing the aspects of the present disclosure is illustrated. In a basic configuration, the computing device 800 is a handheld computer, smart phone, laptop or tablet computer having both input elements and output elements. Those skilled the art will appreciate that although a mobile computing device may be used to perform aspects of the present disclosure such mobility is not required. The computing device 800 typically includes a display 805 and one or more input buttons 810 that allow the user to enter information into the computing device 800. The display 805 of the computing device 800 may also function as an input device (e.g., a touch screen display). If included, an optional side input element 815 allows further user input. The side input element 815 may be a rotary switch, a button, or any other type of manual input element. In alternative aspects, computing device 800 may incorporate more or less input elements. For example, the display 805 may not be a touch screen in some aspects. The computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode) and/or an audio transducer 825 (e.g., a speaker). In yet another aspect, the computing device 800 incorporates input and/or output ports, such as an audio input (e.g., a microphone jack), an audio output (e.g., a headphone jack), and a video output (e.g., an HDMI port) for sending signals to or receiving signals from an external device.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for creating an output signal based on an input signal of different modality, the method comprising:
    receiving the input signal in a first modality;
    encoding the input signal;
    translating the encoded input signal to an encoded output signal using a trained model, wherein the trained model is trained based on visual signals, augmented visual signals, audio signals and augmented audio signals;
    decoding the encoded output signal to create the output signal, the output signal of a second modality which is different than the first modality; and
    presenting the output signal in connection with the input signal.

2. The computer-implemented method of claim 1 wherein the training of the trained model further comprises:
using a first pair of visual and audio networks to train a set of codebooks using the visual signals and the audio signals; and
using a second pair of visual and audio networks to further train the set of codebooks using the augmented visual signals and the augmented audio signals.

3. The computer-implemented method of claim 2 wherein the first and the second visual networks are equally weighted and where the first and the second audio networks are equally weighted.

4. The computer-implemented method of claim 2 wherein the set of codebooks comprises a visual codebook, an audio codebook, and a correlation codebook.

5. The computer-implemented method of claim 1 wherein the augmented visual signal is a flipped version of the visual signal.

6. The computer-implemented method of claim 1 wherein the augmented audio signal comprises the audio signal with a modified noise value.

7. The computer-implemented method of claim 1 wherein the translating operation further comprises generating fake embeddings and using the fake embeddings with the correlation embeddings to generate the output signal.

8. A method for translating a first signal in a first modality to a second signal in a second modality, the method comprising:
receiving a video signal having at least two correlated signals, wherein the correlated signals are of different modality and wherein the at least two signals comprise a visual signal and an audio signal;
extracting the visual signal and provide the visual signal to a first visual encoder;
augmenting the visual signal and provide the augmented visual signal to a second visual encoder;
extracting the audio signal and provide the audio signal to the first audio encoder;
augmenting the audio signal and provide the augmented audio signal to the second audio encoder;
training a visual codebook related to the visual embeddings in the visual signal and the augmented visual signal;
training an audio codebook related to the audio embeddings in the audio signal and the augmented audio signal;
training a correlation codebook related to the correlations between the visual signal, the augmented visual signal, the audio signal, and the augmented audio signal; and
supplying the trained visual codebook, audio codebook and correlation codebook to a trained model for translating the first signal in the first modality to the second signal in the second modality.

9. The method of claim 8, wherein the first and second visual encoders share the same structure and weight and wherein the first and second audio encoders share the same structure and weight.

10. The method of claim 8, wherein the augmented video signal is a flipped version of the video signal.

11. The method of claim 8, wherein the augmented audio signal comprises the audio signal with more or less noise than the audio signal.

12. The method of claim 8, wherein translating the first signal in the first modality to the second signal in the second modality comprises generating fake embeddings and using the fake embeddings with the correlation embeddings to generate the second signal.

13. A system comprising:
an input signal encoder for receiving an input signal in a first modality, the input signal encoder encoding the input signal to an encoded input signal;
a translator translating the encoded input signal to a encoded output signal, the translator using a trained model, wherein the trained model is trained based on visual signals, augmented visual signals, audio signals and augmented audio signals; and
an output signal decoder for decoding the encoded output signal to create an output signal, the output signal of a second modality which is different than the first modality.

14. The system of claim 13 further comprising:
a first pair of visual and audio networks to train a set of codebooks using the visual signals and the audio signals; and
a second pair of visual and audio networks to further train the set of codebooks using the augmented visual signals and the augmented audio signals.

15. The system of claim 14 wherein the first pair of visual and audio networks and the second pair of visual audio networks are equally weighted.

16. The system of claim 14 wherein the set of codebooks comprises a visual codebook, an audio codebook, and a correlation codebook.

17. The system of claim 13 wherein the augmented visual signal is a flipped version of the visual signal.

18. The system of claim 13 wherein the augmented audio signal comprises the audio signal with a modified noise value.

19. The system of claim 13 wherein the translator further generates fake embeddings and uses the fake embeddings with the correlation embeddings to generate the output signal.

* * * * *